United States Patent [19]

Furuse et al.

[11] Patent Number: 5,196,386

[45] Date of Patent: Mar. 23, 1993

[54] SINTERED CERAMIC COMPOSITE BODY AND METHOD OF MANUFACTURING SAME

[75] Inventors: Yutaka Furuse, Choufu; Keiji Matsuhiro, Nagoya, both of Japan

[73] Assignees: The Tokyo Electric Power Company, Incorporated, Tokyo; NGK Insulators, Ltd., Nagoya, both of Japan

[21] Appl. No.: 582,586

[22] Filed: Sep. 14, 1990

[30] Foreign Application Priority Data

Sep. 18, 1989 [JP] Japan .................................. 1-243132
Sep. 18, 1989 [JP] Japan .................................. 1-243134

[51] Int. Cl.$^5$ ............................................ C04B 35/56
[52] U.S. Cl. ...................................... 501/88; 501/89; 501/92
[58] Field of Search ............................. 501/88, 89, 92

[56] References Cited

U.S. PATENT DOCUMENTS

| | | | |
|---|---|---|---|
| 4,612,296 | 9/1986 | Sakamoto et al. | 501/93 |
| 4,745,091 | 5/1988 | Landingham | 501/92 |
| 4,826,791 | 5/1989 | Mehrotra et al. | 501/92 |
| 4,933,308 | 6/1990 | Nishio et al. | 501/92 |

FOREIGN PATENT DOCUMENTS

| | | |
|---|---|---|
| 0247718 | 12/1987 | European Pat. Off. . |
| 0250153 | 12/1987 | European Pat. Off. . |
| 0282879 | 9/1988 | European Pat. Off. . |
| 0344372 | 12/1989 | European Pat. Off. . |
| 0400656 | 12/1990 | European Pat. Off. . |
| 4015358 | 11/1990 | Fed. Rep. of Germany . |
| 2330660 | 6/1977 | France . |
| 59-30770 | 2/1984 | Japan . |
| 59-25748 | 6/1984 | Japan . |
| 61-174165 | 8/1986 | Japan . |
| 62-246865 | 10/1987 | Japan . |
| 63-100067 | 5/1988 | Japan . |

OTHER PUBLICATIONS

*Ceramic Engineering and Science Proceedings,* vol. 9. Nos. 7, 8, Aug. 1988, pp. 725-734, Columbus, Ohio, US; J. D. Katz, et al.: "Microwave Sintering of Alumina-Silicon Carbide Composites at 2.45 and 60 GHz".

World Patents Index Latest Derwent Publications Ltd., London GB; Database WPIL, accession No. 84-078721, week 8413.

World Patents Index Latest Derwent Publications Ltd., London GB; Database WPIL, accession No. 86-243418, week 3786.

WOA-8 904 735 Jun. 1, 1989.

*Chemical Abstracts,* vol. 110, No. 18, May 1989, p. 325, abstract No. 159301k, Columbus, Ohio, US.

*British Ceramic Proceedings,* vol. 45, Apr. 5-7, 1989, pp. 187-198, Stoke-on-Trent, GB; X. Y. Zheng et al: Reinforcement of Silicon Nitride Ceramics with Whiskers and Platelets.

*Ceramic Transactions,* vol. 2, 1989, pp. 407-420, Westerville, Ohio, US; W. D. G. Boecker et al: "Single Phase Alpha-SiC Reinforcements for Composites".

Primary Examiner—Mark L. Bell
Assistant Examiner—Deborah Jones
Attorney, Agent, or Firm—Shea & Gould

[57] ABSTRACT

A sintered ceramic composite body is manufactured by preparing a powdery mixture composed of a base material composed of either one of oxide ceramic such as alumina, mullite, magnesia, or the like, and nonoxide ceramic such as silicon nitride, sialon, or the like, and a reinforcement material composed of particles of silicon carbide which have a size of 1 μm or less and a size ranging from 5 to 20 μm, or have a size of 1 μm or less and platelet silicon carbide particles having a maximum diameter ranging from 5 to 50 μm and a thickness which is ⅓ or less of the maximum diameter, the particles of silicon carbide being contained at a volume ratio ranging from 10 to 50%. The powdery mixture is molded into a shaped product, which is then sintered in a temperature range from 1,400° to 1,900° C. for the base material which is composed of oxide ceramic or in a temperature range from 1,500° to 2,000° C. for the base material which is composed of nonoxide ceramic.

14 Claims, 2 Drawing Sheets

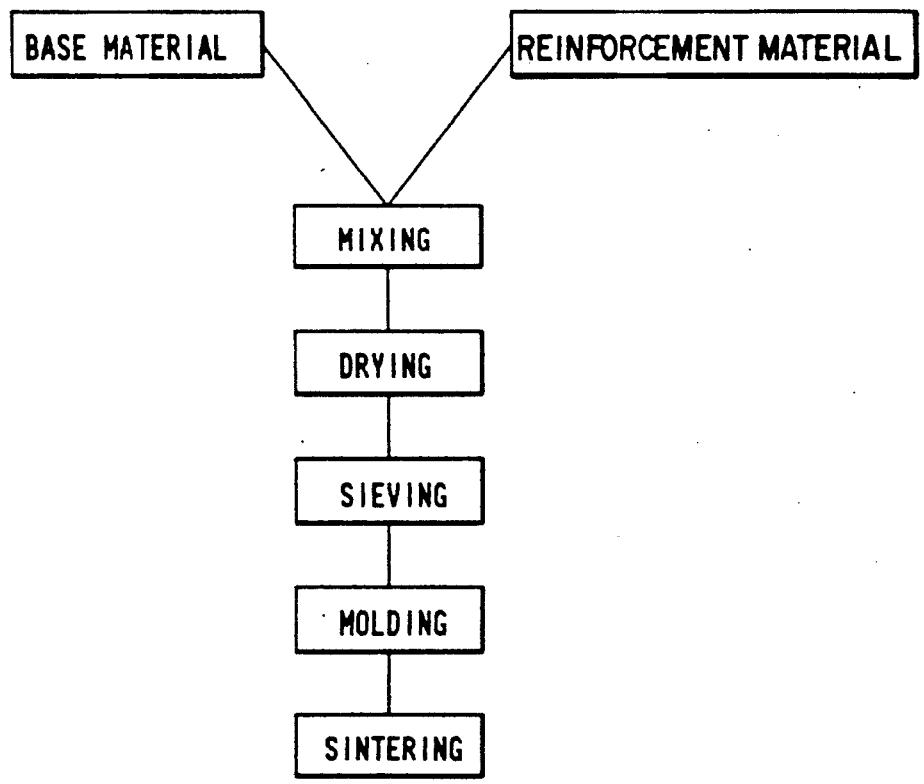

SILICON CARBIDE PARTICLE

PLATELET SILICON CARBIDE PARTICLE

SINTERED CERAMIC COMPOSITE BODY AND METHOD OF MANUFACTURING SAME

BACKGROUND OF THE INVENTION

1. Field of the Invention

The present invention relates to a sintered ceramic composite body with improved toughness and mechanical strength and a method of manufacturing such a sintered ceramic composite body.

2. Prior Art

Ceramic materials have long been used as refractory materials and chemical materials since they are highly resistant to corrosion and heat and high in hardness. The recent advance in the chemical technology allows highly pure materials to be refined and synthesized, and the process control technology makes it possible to produce ceramic materials having widely varied properties, which have attracted much attention in the art. Heat-resistant alloys have heretofore been employed in applications at high temperatures or in adverse environments, such as gas turbine blades. However, there has been a demand for more excellent high-temperature structural materials in view of the recent trend in the market for higher performances. Ceramic is recognized as an important material which meets the requirements in such uses, because it is much better than other materials with respect to heat resistance, acid resistance, and corrosion resistance.

Ceramic materials such as silicon nitride, alumina, silicon carbide are generally brittle, and many of these materials have a fracture toughness of 5 $MNm^{-3/2}$ or less. Various attempts have heretofore been made to improve the toughness of ceramic materials.

One effort to toughen a ceramic material involves the addition of needle-like components such as whiskers, fibers, or the like as a reinforcement material, as disclosed in Japanese Laid-Open Patent Publication No. 59-30770. It is considered that the toughness of a ceramic material with such a reinforcement material is increased by the crack deflection effect in which cracks produced in the ceramic by whiskers or the like dispersed therein are bent, or the whisker pullout effect.

However, it is difficult to disperse needle-like reinforcing elements uniformly in a ceramic material. If fibers are used as a reinforcement material, the dispersed fibers tend to be entangled together into a fiber mass in the ceramic.

Japanese Patent Publication No. 59-25748 discloses a method of toughening an alumina ceramic material with zirconia added as a reinforcement material. According to the disclosed method, zirconia is left as a metastable tetragonal system in alumina down to room temperature, and the mechanical properties of the ceramic material at room temperature are greatly improved by residual compressive stresses which are produced due to a volume expansion by 4% upon crystal system transformation that is caused from the tetragonal system into a monoclinic system owing to stresses at tip ends of produced cracks.

Even with the above ceramic toughening method, however, if the ceramic material is left for a long time in atmosphere at a temperature higher than about 900° C. which is the transformation temperature, then zirconium oxide and the base material which is a nonoxide react with each other to the extent that the properties of the base material can no longer be maintained. As a result, the above toughening effect is not achieved.

Japanese Laid-Open Patent Publication No. 61-174165 shows dispersing silicon carbide in an alumina material for an increased mechanical strength. According to the disclosed method, particles of silicon carbide having an average diameter of 3 $\mu$m or less or whiskers of silicon carbide having a diameter of 1 $\mu$m or less and a length of 20 $\mu$m or less are independently dispersed in an alumina material, applying localized residual stresses alumina grain boundaries, so that the mechanical properties of the composite material at high temperature are improved.

Japanese Laid-Open Patent Publication No. 62-246865 discloses a sintered body of silicon nitride with a rare earth, MgO, and $ZrO_2$ added as sintering aids. Japanese Laid-Open Patent Publication No. 63-100067 shows a sintered material of silicon nitride which contains two or more of $Y_2O_3$, $Er_2O_3$, $Tm_2O_3$, $Yb_2O_3$, and $Lu_2O_3$. However, silicon carbide is not contained as a reinforcement material.

In efforts to increase the toughness of a ceramic material with dispersed whiskers, fibers, or the like, it is difficult to disperse whiskers, fibers, or the like uniformly. Even if these reinforcement elements can be dispersed relatively uniformly, it is impossible to produce sintered ceramic composite bodies of good properties unless specially processed in the manufacturing process. Use of whiskers, fibers, or other reinforcement materials is highly expensive. In the case where particles of zirconium oxide are dispersed for increased toughness, no toughening effect is achieved at high temperatures where no crystal system transformation progresses. If the ceramic material is left at a high temperature for a long period of time, then zirconium oxide and the base material which is a nonoxide react with each other, and the properties of the base material are no longer maintained.

SUMMARY OF THE INVENTION

It is an object of the present invention to provide a sintered ceramic composite body which is toughened and mechanically strengthened by adding silicon carbide particles of predetermined shape as a reinforcement material to a base material which is an oxide or a nonoxide, and a method of manufacturing such a sintered ceramic composite body.

Another object of the present invention is to provide a sintered ceramic composite body comprising a base material composed of either one of oxide ceramic such as alumina, mullite, magnesia, or the like, and nonoxide ceramic such as silicon nitride, sialon, or the like, and a reinforcement material composed of particles of silicon carbide which have a size of 1 $\mu$m or less and a size ranging from 5 to 20 $\mu$m.

Still another object of the present invention is to provide the sintered ceramic composite body wherein the particles of silicon carbide are contained at a volume ratio ranging from 10 to 50%.

Yet another object of the present invention is to provide a method of manufacturing a sintered ceramic composite body, comprising preparing a powdery mixture composed of a base material composed of either one of oxide ceramic such as alumina, mullite, magnesia, or the like, and nonoxide ceramic such as silicon nitride, sialon, or the like, and a reinforcement material composed of particles of silicon carbide which have a size of 1 $\mu$m or less and a size ranging from 5 to 20 $\mu$m, the particles of silicon carbide being contained at a volume ratio ranging from 10 to 50%, molding the powdery mixture into a shaped product, and sintering the shaped product in a temperature range from 1,400° to 1,900° C. for the base material which is composed of oxide ceramic or in a temperature range from 1,500° to 2,000° C. for the base material which is composed of nonoxide ceramic.

It is also an object of the present invention to provide a sintered ceramic composite body comprising a base material composed of either one of oxide ceramic such as alumina, mullite, magnesia, or the like, and nonoxide ceramic such as silicon nitride, sialon, or the like, and a reinforcement material composed of particles of silicon carbide having a size of 1 μm or less and platelet particles of silicon carbide which have a maximum diameter ranging from 5 to 50 μm and a thickness which is ⅓ or less of the maximum diameter.

A further object of the present invention is to provide the sintered ceramic composite body wherein the particles of silicon carbide and the platelet particles of silicon carbide are contained at a volume ratio ranging from 10 to 50%.

A yet further object of the present invention is to provide a method of manufacturing a sintered ceramic composite body, comprising preparing a powdery mixture composed of a base material composed of either one of oxide ceramic such as alumina, mullite, magnesia, or the like, and nonoxide ceramic such as silicon nitride, sialon, or the like, and a reinforcement material composed of particles of silicon carbide having a size of 1 μm or less and platelet particles of silicon carbide which have a maximum diameter ranging from 5 to 50 μm and a thickness which is ⅓ or less of the maximum diameter, the particles of silicon carbide and the platelet particles of silicon carbide being contained at a volume ratio ranging from 10 to 50%, molding the powdery mixture into a shaped product, and sintering the shaped product in a temperature range from 1,400° to 1,900° C. for the base material which is composed of oxide ceramic or in a temperature range from 1,500° to 2,000° C. for the base material which is composed of nonoxide ceramic.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a flowchart of a method of manufacturing a sintered ceramic composite body according to the present invention.

DETAILED DESCRIPTION OF THE PREFERRED EMBODIMENT

Figure 2A:
FIGS. 2 (a) and 2(b) are views showing defined dimensions of a silicon carbide particle used as a reinforcement material.

A sintered ceramic composite body according to the present invention comprises, as a base material, an oxide ceramic material such as alumina, magnesia, mullite, etc., or a nonoxide ceramic material such as silicon nitride, sialon, etc., the silicon nitride containing two or more of $Y_2O_3$, $Er_2O_3$, $Tm_2O_3$, $Yb_2O_3$, $Lu_2O_3$, or a rare earth, MgO, and $ZrO_2$, and, as a reinforcement material, particles of silicon carbide. Small amounts of other elements may be contained as impurities in the above materials. It is preferable that a sintering aid be added to the materials of the sintered ceramic composite as is the case with ordinary sintered bodies composed of oxide or nonoxide ceramic. The sintered ceramic composite according to the present invention may be shaped by any of ordinary shaping processes such as pressing, slip casting, injection molding, extrusion molding, etc. The materials of the ceramic composite are sintered in a vacuum or inert gas atmosphere by hot pressing (HP), but may also be sintered by normal-pressure sintering, sinter-HIP, or capsule HIP.

The particles of silicon carbide as the reinforcement material are of a size of 1 μm or smaller and also of a size ranging from 5 to 20 μm, and 10 to 50% or preferably 20 to 40% by volume of such particles of silicon carbide are added to the base material, forming a powdery mixture. Alternatively, the particles of silicon carbide as the reinforcement material are of a size of 1 μm or smaller and are also in the form of platelets having a maximum diameter ranging from 5 to 50 μm, preferably, from 10 to 40 μm, and a thickness which is ⅓ or less of the maximum diameter, and 10 to 50% or preferably 20 to 40% of such particles and platelet particles of silicon carbide are added to the base material, forming a powdery mixture. The powdery mixture thus obtained is molded to shape. The shaped product is then sintered in a temperature range from 1,400° to 1,900° C. for the base material which is an oxide ceramic, or in a temperature range from 1,500° to 2,000° C. for the base material which is a nonoxide ceramic. The sintered ceramic composite body thus produced has a high degree of toughness and mechanical strength.

If the base material is a nonoxide ceramic, then silicon nitride and sialon contained in the base material are decomposed at a high rate when the sintering temperature becomes higher than 1,700° C. To avoid such accelerated decomposition, the pressure of a nitrogen atmosphere used is normally increased up to a range from 9 to 9.9 $kg.f/cm^2$. If the sintering temperature were lower than the above ranges, the density of the sintered body would be low. If the sintering temperature were higher than the above ranges, the components of the base material would be decomposed. At any rate, no dense sintered body would be produced. The optimum sintering temperature varies depending on the conditions of the normal-pressure sintering, the hot pressing, sinter-HIP, and the capsule HIP, and the size and amount of silicon carbide particles as the reinforcement material.

If the added amount of silicon carbide particles were less than 10% by volume, then no increase in the fracture toughness and mechanical strength would be achieved. If the added amount of silicon carbide particles were larger than 50%, then the density of the produced sintered ceramic composite body would be too low and hence no dense sintered ceramic composite body would be manufactured. If the size of silicon carbide particles were not 1 μm and less and also not in the range from 5 to 20 μm, then the properties would not be improved. More specifically, if particles having a size of 1 μm or less were not contained, no mechanical strength would be improved, and if particles having a size ranging from 5 to 20 μm were not contained, i.e., if only particles having a size ranging from 1 to 5 μm and particles having a size of 1 μm or less and a size ranging from 1 to 5 μm were contained in combination, no fracture toughness would be improved. If only particles having a size of 20 μm or greater and particles having a size of 1 μm or less and a size of 20 μm or greater were contained in combination, the density of the produced sintered ceramic composite body would be too low.

No properties would also be improved if silicon carbide particles having a size of 1 μm or less and platelet silicon carbide particles having a maximum diameter ranging from 5 to 50 μm and a thickness which is ⅓ or less of the maximum diameter were not simultaneously contained. Specifically if particles having a size of 1 μm or smaller were not contained, the mechanical strength would be improved, and if platelet particles having a maximum diameter ranging from 5 to 50 μm and a thickness which is ⅓ or less of the maximum diameter were not contained, i.e., if particles having a size of 1 μm or less and platelet particles having a maximum diameter of 5 μm or less were contained in combination, then the fracture toughness would not be improved. If particles having a size of 1 μm or less and platelet particles having a maximum diameter of 50 μm or greater were contained in combination, then the density of the produced sintered ceramic composite body would be too low.

A four-point flexural strength test is carried out according to the fine ceramic flexural strength test procedure provided for in JIS R1601. The fracture toughness is measured by the SEPB (Single Edge Pre-cracked Beam) process. More specifically, a test specimen is prepared according to JIS R1601, indented by the diamond pyramid indenter of a Vickers hardness test machine, and subjected to a load for producing a pre-crack, with a pop-in detected by earphones. Then, the test specimen is colored for the measurement of the pre-crack, subjected to a bending test, and thereafter measured for a fracture load. After the length of the precrack in the fractured test specimen is measured, a fracture toughness value is calculated according to the fracture toughness equation.

FIG. 1 shows a sequence of a method according to the present invention. The base material and the reinforcement material were placed in a pot mill, and mixed with water or ethanol for 24 hours, thus forming a mixture. As described above, irrespective of whether the base material is an oxide ceramic material or a nonoxide ceramic material, the reinforcement material was added at a volume ratio ranging from 10 to 50%, either in the form of particles of silicon carbide having a size of 1 μm or less and a size ranging from 5 to 20 or in the form of particles of silicon carbide having a size of 1 μm or less and platelet particles of silicon carbide having a maximum diameter ranging from 5 to 50 μm, and a thickness which is ⅓ or less of the maximum diameter.

Figure 2B:
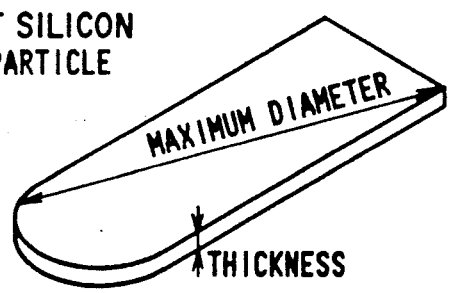

FIGS. 2(a) and 2(b) show dimensional definitions of silicon carbide particles. As shown in FIG. 2(a), a silicon carbide particle has a minor-axis diameter (i.e., a minimum distance across the particle between two parallel lines contacting the particle) ranging from 5 to 20 μm. FIG. 2(b) illustrates a platelet silicon carbide particle having a maximum diameter ranging from 5 to 50 μm and a thickness which is ⅓ or less of the maximum diameter.

The mixture produced in the pot mill was then dried at 120° C. for 24 hours, and passed through a sieve having a mesh size of 149 μm, thereby forming a powder. The powder was then pressed to shape under a pressure of 200 kg/cm², or pressed to shape under a pressure of 7 tons/cm² by a rubber press, after which the shaped product was sintered. For the base material which is an oxide ceramic, the shaped product was sintered at an HP temperature ranging from 1,400° to 1,900° C. in an Ar atmosphere under 1 atm. For the base material which is a nonoxide ceramic, the shaped product was sintered at an HP temperature ranging from 1,500° to 2,000° C. in an N₂ atmosphere under 1 atm. The HP pressure was 300 kg/cm². For the base material which is a nonoxide ceramic material, the shaped product was sintered at a temperature of 1,700° C. or higher in an N₂ atmosphere under 9.5 atm, for the reasons described above.

Tables 1—1, 1-2, and 1-3 show the results of a fracture toughness and mechanical strength test conducted on various inventive and comparative examples. The base materials of the examples included alumina, mullite, and magnesia as oxide ceramic materials, and silicon nitride containing two or more of $Y_2O_3$, $Er_2O_3$, $Tm_2O_3$, $Yb_2O_3$, $Lu_2O_3$, or a rare earth, MgO, and $ZrO_2$ as nonoxide materials, and silicon Carbide was added as a reinforcement material to the base materials under the conditions given in Tables 1—1, 1-2, and 1-3.

The sintered ceramic composite body according to the present invention is high in toughness and mechanical strength because of silicon carbide particles of suitable shape and size dispersed at a suitable volume rate to a base material which is an oxide or a nonoxide. The sintered ceramic composite body according to the present invention requires no special equipment for its manufacture, but can be manufactured by ordinary ceramic manufacturing equipment. Therefore, the sintered ceramic composite body can be manufactured at a low cost.

Although a certain preferred embodiment has been shown and described, it should be understood that many changes and modifications may be made therein without departing from the scope of the appended claims.

TABLE 1-1

| | No. | BASE MATERIAL (vol %) | ADDED AMOUNT OF SiC LESS THAN 1 μm (vol %) | ADDED AMOUNT OF SiC GREATER THAN 5 μM (vol %) | SIZE OF SiC PARTICLES (μM) | HP TEMPERATURE (°C.) | $\sigma_{RT}$ | $k_{IC}$ |
|---|---|---|---|---|---|---|---|---|
| | | ALUMINA | | | | | | |
| INVEN- | 1 | 90 | 5 | 5 | 20 | 1400 | 500 | 5.0 |
| TIVE | 2 | 85 | 5 | 10 | 10 | 1800 | 480 | 4.8 |
| EXAMPLE | 3 | 80 | 10 | 10 | 5 | 1800 | 600 | 5.2 |
| | 4 | 70 | 20 | 10 | 20 | 1800 | 680 | 5.6 |
| | 5 | 60 | 30 | 10 | 20 | 1850 | 800 | 5.4 |
| | 6 | 50 | 30 | 20 | 20 | 1900 | 520 | 5.1 |
| | 7 | 90 | 5 | 5 | *PLATELET 30 × 5 | 1400 | 490 | 5.6 |
| | 8 | 80 | 10 | 10 | *PLATELET 40 × 5 | 1500 | 520 | 7.1 |
| | 9 | 70 | 20 | 10 | *PLATELET 30 × 5 | 1800 | 600 | 7.0 |
| | 10 | 70 | 20 | 10 | *PLATELET 50 × 5 | 1850 | 580 | 7.1 |

TABLE 1-1-continued

| | No. | BASE MATERIAL (vol %) | ADDED AMOUNT OF SiC LESS THAN 1 μm (vol %) | ADDED AMOUNT OF SiC GREATER THAN 5 μM (vol %) | SIZE OF SiC PARTICLES (μM) | HP TEMPERATURE (°C.) | $\sigma_{RT}$ | $k_{IC}$ |
|---|---|---|---|---|---|---|---|---|
| | 11 | 60 | 20 | 20 | *PLATELET 10 × 3 | 1900 | 625 | 6.8 |
| | 12 | 50 | 30 | 20 | *PLATELET 5 × 1 | 1900 | 517 | 5.9 |
| COMPARATIVE EXAMPLE | 13 | 100 | — | — | — | 1400 | 400 | 3.8 |
| | 14 | 92 | 3 | 5 | 20 | 1600 | 404 | 5.0 |
| | 15 | 40 | 30 | 30 | 20 | 1900 | 121 | 306 |
| | 16 | 70 | 10 | 20 | 10 | 2000 | 110 | 3.0 |
| | 17 | 85 | 10 | 5 | 30 | 1300 | 245 | 3.0 |
| | | MULLITE | | | | | | |
| INVENTIVE EXAMPLE | 18 | 65 | 30 | 5 | 20 | 1700 | 509 | 3.0 |
| | 19 | 70 | 10 | 20 | 20 | 1700 | 421 | 3.8 |
| COMPARATIVE EXAMPLE | 20 | 100 | — | — | — | 1600 | 272 | 2.0 |
| | | MAGNESIA | | | | | | |
| INVENTIVE EXAMPLE | 21 | 65 | 30 | 5 | 20 | 1800 | 500 | 3.4 |
| COMPARATIVE EXAMPLE | 22 | 100 | — | — | — | 1300 | 300 | 1.0 |

*PLATELET = MAXIMUM DIAMETER × THICKNESS
$\sigma_{RT}$: FLEXURAL STRENGTH (MP$_a$) (ADVANTAGE OF n = 3)
$k_{IC}$: FRACTURE TOUGHNESS (MNm$^{-3/2}$) (ADVANTAGE OF n = 3)

TABLE 1-2

| | No. | BASE MATERIAL (vol %) | ADDED AMOUNT OF SiC LESS THAN 1 μm (vol %) | ADDED AMOUNT OF SiC GREATER THAN 5 μm (vol %) | SIZE OF SiC PARTICLES (μM) | **SINTERING ASSISTANT (wt %) | | | HP TEMPERATURE (°C.) | FLEXURAL STRENGTH (MP$_a$) | FRACTURE TOUGHNESS (MNm$^{-3/2}$) |
|---|---|---|---|---|---|---|---|---|---|---|---|
| | | SILICON NITRIDE | | | | | | | | | |
| INVENTIVE EXAMPLE | 1 | 90 | 5 | 5 | 10 | Y$_2$O$_3$ 6 | MgO 4 | ZrO$_2$ 0.5 | 1500 | 1000 | 6.8 |
| | 2 | 80 | 10 | 10 | 10 | Y$_2$O$_3$ 6 | MgO 4 | ZrO$_2$ 0.5 | 1800 | 990 | 8.6 |
| | 3 | 80 | 5 | 15 | 5 | Y$_2$O$_3$ 6 | MgO 4 | ZrO$_2$ 0.5 | 1800 | 980 | 8.5 |
| | 4 | 75 | 15 | 10 | 20 | Y$_2$O$_3$ 6 | MgO 4 | ZrO$_2$ 0.5 | 1750 | 1013 | 9.0 |
| | 5 | 60 | 20 | 20 | 20 | Y$_2$O$_3$ 6 | MgO 4 | ZrO$_2$ 0.5 | 1900 | 1025 | 9.1 |
| | 6 | 60 | 10 | 30 | 20 | Y$_2$O$_3$ 6 | MgO 4 | ZrO$_2$ 0.5 | 1900 | 870 | 9.3 |
| | 7 | 50 | 20 | 30 | 10 | Y$_2$O$_3$ 6 | MgO 4 | ZrO$_2$ 0.5 | 2000 | 850 | 9.3 |
| | 8 | 90 | 5 | 5 | *PLATELET 30 × 5 | Y$_2$O$_3$ 6 | MgO 4 | ZrO$_2$ 0.5 | 1500 | 850 | 9.2 |
| | 9 | 80 | 10 | 10 | *PLATELET 40 × 5 | Y$_2$O$_3$ 6 | MgO 4 | ZrO$_2$ 0.5 | 1800 | 900 | 9.8 |
| | 10 | 70 | 20 | 10 | *PLATELET 30 × 5 | Y$_2$O$_3$ 6 | MgO 4 | ZrO$_2$ 0.5 | 1800 | 950 | 9.8 |
| | 11 | 70 | 20 | 10 | *PLATELET 50 × 5 | Y$_2$O$_3$ 6 | MgO 4 | ZrO$_2$ 0.5 | 1800 | 790 | 10.1 |
| | 12 | 60 | 20 | 20 | *PLATELET 10 × 3 | Y$_2$O$_3$ 6 | MgO 4 | ZrO$_2$ 0.5 | 1900 | 980 | 8.3 |
| | 13 | 50 | 30 | 20 | *PLATELET 5 × 1 | Y$_2$O$_3$ 6 | MgO 4 | ZrO$_2$ 0.5 | 2000 | 800 | 7.2 |
| | 14 | 70 | 10 | 20 | 20 | Y$_2$O$_3$ 5.7 Yb$_2$O$_3$ 3.8 | | | 1900 | 820 | 9.0 |
| | 15 | 70 | 20 | 10 | *PLATELET 30 × 5 | Y$_2$O$_3$ 5.7 Yb$_2$O$_3$ 3.8 | | | 1900 | 770 | 9.9 |
| | 16 | 70 | 10 | 20 | 20 | Y$_2$O$_3$ 4.0 Er$_2$O$_3$ 4.0 | | | 1900 | 850 | 8.6 |
| | 17 | 70 | 10 | 20 | 20 | Yb$_2$O$_3$ 7.0 Lu$_2$O$_3$ 5.0 Y$_2$O$_3$ 3.0 | | | 1900 | 850 | 8.4 |

TABLE 1-2-continued

| | No. | BASE MATERIAL (vol %) | ADDED AMOUNT OF SiC LESS THAN 1 μm (vol %) | ADDED AMOUNT OF SiC GREATER THAN 5 μm (vol %) | SIZE OF SiC PARTICLES (μM) | **SINTERING ASSISTANT (wt %) | | | HP TEMPERATURE (°C.) | FLEXURAL STRENGTH (MP$_a$) | FRACTURE TOUGHNESS (MNm$^{-3/2}$) |
|---|---|---|---|---|---|---|---|---|---|---|---|
| | 18 | 70 | 10 | 20 | 20 | Tm$_2$O$_3$ | 5.0 | | 1900 | 810 | 8.7 |
| COMPARATIVE EXAMPLE | 19 | 100 | 0 | 0 | — | Y$_2$O$_3$ 6 | MgO 4 | ZrO$_2$ 0.5 | 1800 | 980 | 6.0 |
| | 20 | 70 | 0 | 30 | 20 | Y$_2$O$_3$ 6 | MgO 4 | ZrO$_2$ 0.5 | 1800 | 620 | 9.5 |
| | 21 | 90 | 10 | 0 | — | Y$_2$O$_3$ 6 | MgO 4 | ZrO$_2$ 0.5 | 1800 | 1000 | 5.7 |
| | 22 | 95 | 2 | 3 | 20 | Y$_2$O$_3$ 6 | MgO 4 | ZrO$_2$ 0.5 | 1800 | 720 | 8.5 |
| | 23 | 40 | 30 | 30 | 20 | Y$_2$O$_3$ 6 | MgO 3 | ZrO$_2$ 0.4 | 2100 | 310 | 3.9 |
| | 24 | 100 | 0 | 0 | — | Y$_2$O$_3$ Yb$_2$O$_3$ | 5.7 3.8 | | 1800 | 690 | 7.2 |
| | 25 | 70 | 0 | 30 | 20 | Y$_2$O$_3$ Yb$_2$O$_3$ | 5.7 3.8 | | 1800 | 540 | 9.3 |

*PLATELET = MAXIMUM DIAMETER × THICKNESS
**PROPORTION ADDED TO BASE MATERIAL OF SILICON NITRIDE
FLEXURAL STRENGTH (MP$_a$) (ADVANTAGE OF n = 3)
FRACTURE TOUGHNESS (MNm$^{-3/2}$) (ADVANTAGE OF n = 3)

TABLE 1-3

| | No. | BASE MATERIAL (vol %) | ADDED AMOUNT OF SiC LESS THAN 1 μm (vol %) | ADDED AMOUNT OF SiC GREATER THAN 5 μM (vol %) | SIZE OF SiC PARTICLES (μM) | HP TEMPERATURE (°C.) | $\sigma_{RT}$ | $k_{IC}$ |
|---|---|---|---|---|---|---|---|---|
| | | SIALON | | | | | | |
| INVENTIVE EXAMPLE | 1 | 60 | 10 | 30 | 10 | 1750 | 480 | 5.6 |
| COMPARATIVE EXAMPLE | 2 | 100 | — | — | — | 1750 | 406 | 3.8 |
| | 3 | 70 | — | 30 | 10 | 1800 | 354 | 5.6 |

$\sigma_{RT}$: FLEXURAL STRENGTH (MP$_a$) (ADVANTAGE OF n = 3)
$k_{IC}$: FRACTURE TOUGHNESS (MNm$^{-3/2}$) (ADVANTAGE OF n = 3)

What is claimed is:

1. A sintered ceramic composite body consisting essentially of:
   a base material selected from the group consisting of oxide ceramics and nonoxide ceramics and
   a reinforcement material consisting essentially of particles of silicon carbide which have a size of 1 μm or less and particles of silicon carbide having a size ranging from 5 to 20 μm,
   the volume ratio of said reinforcement material to said base material being in the rang of 10 to 50%.

2. A sintered ceramic composite body consisting essentially of:
   a base material selected from the group consisting of oxide ceramics and nonoxide ceramics and
   a reinforcement material consisting essentially of particles of silicon carbide having a size of 1 μm or less and platelet particles of silicon carbide which have a maximum diameter ranging from 5 to 50 μm and a thickness which is ⅓ or less of the maximum diameter,
   the volume ratio of said reinforcement material to said base material being in the range of 10 to 50%.

3. A sintered ceramic composite body according to claim 1 wherein the base material is an oxide ceramic selected from the group consisting of alumina, mullite, and magnesia.

4. A sintered ceramic composite body according to claim 1 wherein the base material is a nonoxide ceramic selected from the group consisting of silicon nitride and sialon.

5. A sintered ceramic composite body according to claim 1 wherein the composite body has both a flexural strength and a toughness greater than the sintered base material alone.

6. A sintered ceramic composite body according to claim 4, wherein said base material is silicon nitride containing at least two materials selected from the group consisting of Y$_2$O$_3$, Er$_2$O$_3$, Tm$_2$O$_3$, Yb$_2$O$_3$ and Lu$_2$O$_3$.

7. A sintered ceramic composite body according to claim 4, wherein said base material is silicon nitride containing a rare earth, MgO and ZrO$_2$.

8. A sintered ceramic composite body according to claim 4, wherein said base material is sialon.

9. A sintered ceramic composite body according to claim 2 wherein the base material is an oxide ceramic selected from the group consisting of alumina, mullite, and magnesia.

10. A sintered ceramic composite body according to claim 2 wherein the base material is a nonoxide ceramic selected from the group consisting of silicon nitride and sialon.

11. A sintered ceramic composite body according to claim 2 wherein the composite body has both flexural strength and a toughness greater than the sintered base material alone.

12. A sintered ceramic composite body according to claim 10, wherein said base material is silicon nitride containing at least two materials selected from the group consisting of $Y_2O_3$, $Er_2O_3$, $Tm_2O_3$, $Yb_2O_3$ and $Lu_2O_3$.

13. A sintered ceramic composite body according to claim 10, wherein said base material is silicon nitride containing a rare earth, MgO and $ZrO_2$.

14. A sintered ceramic composite body according to claim 10, wherein said base material is sialon.

* * * * *